United States Patent
Di Franco et al.

(10) Patent No.: US 7,679,339 B2
(45) Date of Patent: Mar. 16, 2010

(54) SWITCHING POWER SUPPLY WITH VOLTAGE LIMITING DEVICE AND CONTROL METHOD THEREOF

(75) Inventors: Fabrizio Gaetano Di Franco, Agira (IT); Cosimo Leonardi, Acireale (IT); Rosario Davide Stracquadaini, Vittoria (IT); Francesco Giovanni Gennaro, Catania (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 0 days.

(21) Appl. No.: 11/496,003

(22) Filed: Jul. 28, 2006

(65) Prior Publication Data
US 2007/0024258 A1 Feb. 1, 2007

(30) Foreign Application Priority Data
Jul. 29, 2005 (EP) .................... 05425565

(51) Int. Cl.
*G05F 3/16* (2006.01)
(52) U.S. Cl. .................................. 323/224
(58) Field of Classification Search ........... 363/16, 363/18; 323/222, 282, 224, 266
See application file for complete search history.

(56) References Cited

U.S. PATENT DOCUMENTS 4,347,475 A * 8/1982 Ullin ..................... 323/303
4,806,844 A * 2/1989 Claydon et al. ............ 323/311
5,072,171 A * 12/1991 Eng ......................... 323/283
5,095,261 A * 3/1992 Schoofs .................... 323/222
5,126,652 A * 6/1992 Carlin ...................... 323/267
7,091,672 B2 * 8/2006 Steffie et al. ............... 315/282

FOREIGN PATENT DOCUMENTS

| DE | 100 65 040 A1 | 6/2002 |
| EP | 0 373 712 A2 | 6/1990 |
| EP | 0 375 020 A2 | 6/1990 |

OTHER PUBLICATIONS

European Search Report from European Patent Application 05425565.8, filed Jul. 29, 2005.

* cited by examiner

*Primary Examiner*—Bao Q Vu
*Assistant Examiner*—Jue Zhang
(74) *Attorney, Agent, or Firm*—Lisa K. Jorgenson; James H. Morris; Wolf, Greenfield & Sacks, P.C.

(57) ABSTRACT

A switching power supply includes input terminals, which receive a first voltage, and a switching converter stage, provided with a first switching device. The power supply further includes a second switching device, connected between the input terminals and the switching converter stage, and an activation device, associated with the second switching device for controlling the second switching device so as to limit a second voltage applied to the switching converter stage.

15 Claims, 2 Drawing Sheets

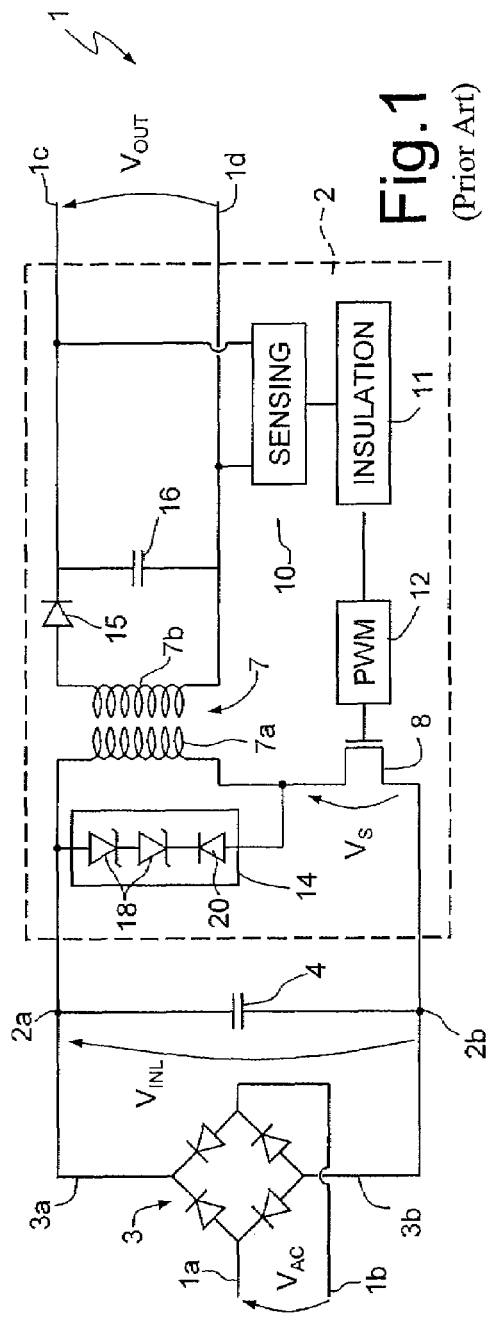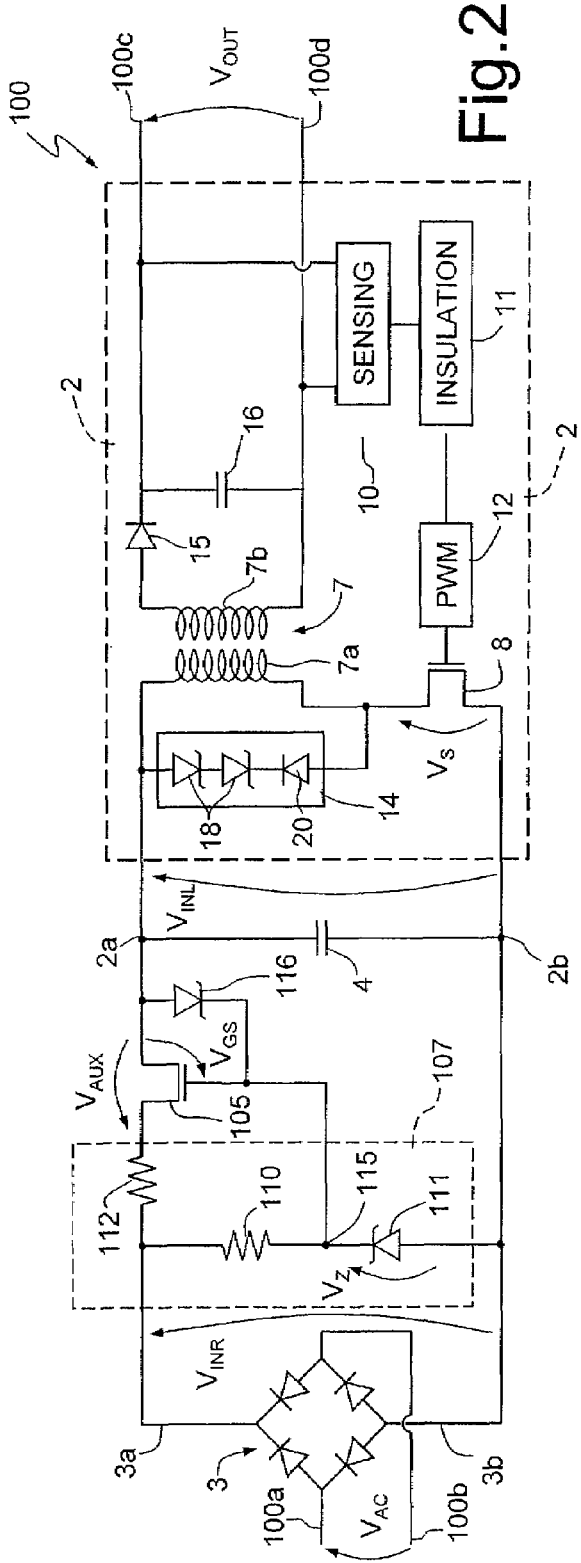

SWITCHING POWER SUPPLY WITH VOLTAGE LIMITING DEVICE AND CONTROL METHOD THEREOF

BACKGROUND OF THE INVENTION

1. Field of the Invention

The present invention relates to a switching power supply provided with a voltage-limiting device and to a control method thereof.

2. Discussion of the Related Art

As is known, switching power supplies can be used for a wide range of applications of low, medium and high power. In many cases, the nominal input and output voltages and currents are not exceptionally high (the input voltages, for example, are often in the region of 300-500 V). However, in particular operating conditions that also commonly arise, some components must withstand decidedly higher voltage drops. In these cases, it is necessary to use active and/or passive power components, specifically designed for withstanding voltages of up to 1000-1500 V.

For greater clarity, reference will be made to a flyback-type switching power supply, as the one designated by the reference number 1 in FIG. 1.

The power supply 1 comprises an SMPS (Switch-Mode Power Supply) converter stage 2 in flyback configuration, a diode rectifier bridge 3 and a first filter capacitor 4.

A first terminal and a second terminal of the rectifier bridge 3 form a first input 1a and a second input 1b of the power supply 12 and receive an AC input voltage $V_{AC}$. The rectifier bridge 3 is moreover connected to a first input 2a and to a second input 2b of the SMPS converter stage 2, which is also provided with a first output and a second output, which form, respectively, a first output 1c and a second output 1d of the power supply 1. The first filter capacitor 4 is connected between the first input 2a and the second input 2b of the SMPS converter stage 2.

The SMPS converter stage 2 comprises a transformer 7, having a primary winding 7a and a secondary winding 7b, a main switch transistor 8, here of an NMOS type, a sense circuit 10, an insulation circuit 11, a PWM-control circuit 12 (PWM—Pulse Width Modulation), and a protection circuit 14.

The primary winding 7a of the transformer 7 is connected to the first input 2a of the SMPS converter stage 2 and to a drain terminal of the main switch transistor 8, which has its source terminal connected to the second input 2b. The secondary winding 7b is connected to the first output 1a and to the second output 1b of the power supply 1 through a diode 15 and a second filter capacitor 16, in a conventional way.

The sense circuit 10, the insulation circuit 11 and the PWM-control circuit 12 are cascade-connected between the first output 1a and the second output 1b on one side and a gate terminal of the main switch transistor 8 on the other, so as to form a feedback control loop, which is also of a conventional type. In particular, the PWM-control circuit 12 switches the main switch transistor 8 with a controlled duty cycle so as to present an output voltage $V_{OUT}$ of a predetermined value between the first output 1a and the second output 1b of the power supply 1.

The protection circuit 14 is connected between the terminal of the primary winding 7a of the transformer 7 and is designed to limit the maximum voltage drop on the primary winding 7a itself. Typically, the protection circuit 14 comprises a series of zener diodes 18 and a diode 20 and intervenes in a one-directional way to limit the voltage on the primary winding to a maximum voltage $V_{MAX}$, for example, of 300 V.

During operation of the power supply 1, the main switch transistor 8 may be subjected to very high voltages. The switch voltage $V_S$ between the drain terminal and the source terminal of the main switch transistor 8 is due to a levelled input voltage $V_{INL}$, to a reflected voltage and to a dispersion voltage of the transformer 7. The levelled input voltage $V_{INL}$ is supplied between the inputs 2a, 2b of the SMPS converter stage 2 and is given by the AC input voltage $V_{AC}$ (more precisely, the levelled input voltage $V_{INL}$ is equal to $\sqrt{2}V_{AC}$). Assuming an AC input voltage $V_{AC}$ of 450 V, the levelled input voltage $V_{INL}$ is approximately 630 V. The reflected voltage is due to an imperfect matching of the load and can reach peak values of approximately 300 V. The dispersion voltage of the transformer 7 is limited to the maximum voltage $V_{MAX}$ (300 V) by the protection circuit 14. Consequently, in the most unfavorable conditions, the main switch transistor 8 must be able to withstand a switch voltage $V_S$ given by:

$$V_S = 630 + 300 + 300 = 1230 \text{ V}$$

Although current technologies certainly enable construction of active and passive semiconductor components capable of withstanding voltages that are so high, the design and fabrication of such components is, however, much more costly than for components designed to operate with lower voltages.

Use has been proposed of additional components, such as auxiliary switching devices that can be activated in given circumstances, for subtracting part of the voltage applied to the components that operate in the most critical conditions. The solutions so far identified are, however, not flexible and can be used only on some types of power supply.

SUMMARY OF THE INVENTION

One aim of the present invention is to provide a switching power supply that is free from the limitations described above.

According to the present invention, a switching power supply comprises input terminals, receiving a first voltage; and a switching converter stage, including a first switching device; a second switching device, connected between said input terminals and said switching converter stage; and an activation device, for controlling said second switching device so as to limit a second voltage applied to said switching converter stage.

The present invention also provides a control method for a switching power supply comprising: providing a first voltage to input terminals of said power supply; generating a second voltage starting from said first voltage; and converting by switching said second voltage by means of a first switching device; and limiting said second voltage in an operative condition using a second switching device.

BRIEF DESCRIPTION OF THE DRAWINGS

For a better understanding of the invention, there are now described some embodiments, purely by way of non-limiting example and with reference to the attached plate of drawings, wherein:

FIG. 1 is a simplified electric diagram of a switching power supply of a known type;

FIG. 2 is a simplified electric diagram of a switching power supply according to a first embodiment of the invention.

DETAILED DESCRIPTION

Figure 3:
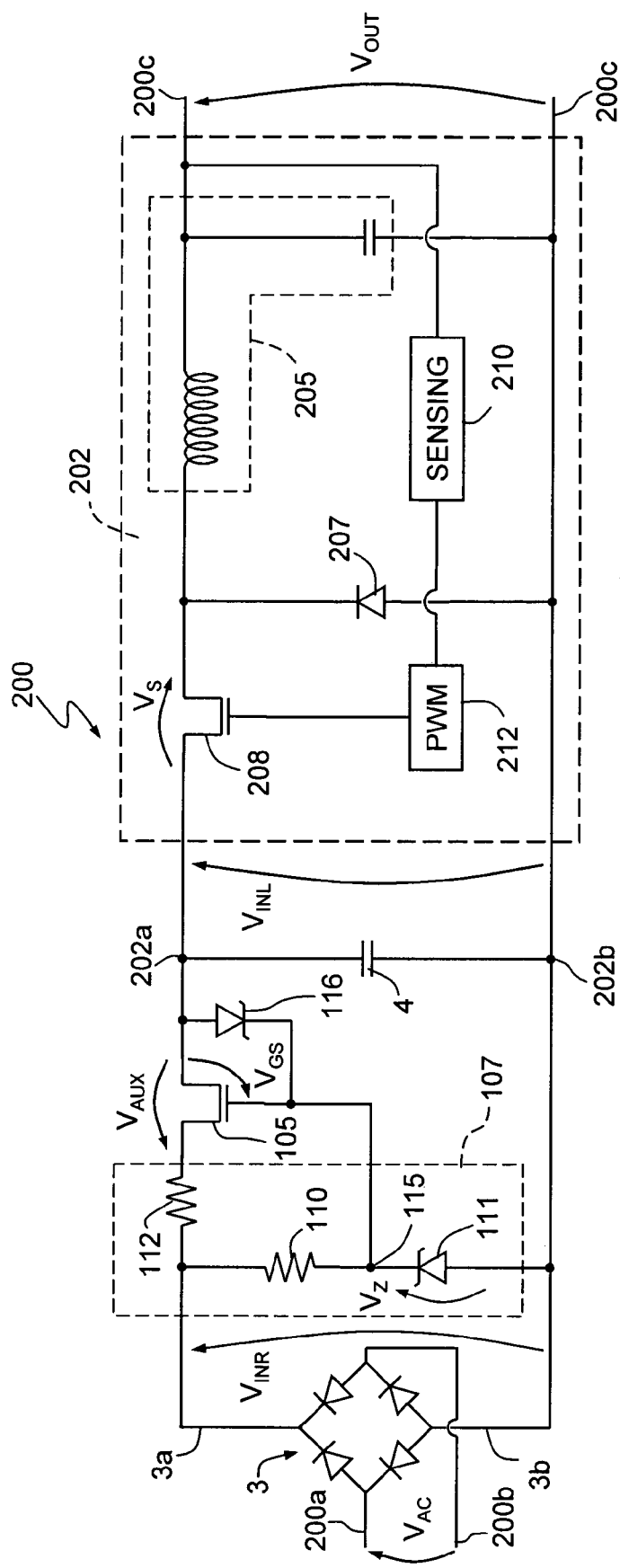
FIG. 3 is a simplified electric diagram of a switching power supply according to a second embodiment of the invention.

With reference to FIG. 2, in which parts that are the same as those already described are designated by the same reference numbers, a switching power supply 100 has a first input 100a and a second input 100b and a first output 100c and a second output 100d and comprises the SMPS converter stage 2, the diode rectifier bridge 3 and the first filter capacitor 4. Furthermore, the power supply 100 includes an auxiliary transistor 105 and an activation network 107 associated thereto.

A first tap terminal and a second tap terminal of the rectifier bridge 3 form the first input 100a and the second input 100b of the power supply 12 and receive the AC input voltage $V_{AC}$. Furthermore, the rectifier bridge 3 has a first rectifying terminal 3a connected to the activation network 107 and a second rectifying terminal 3b connected to the second input 2b of the SMPS converter stage 2. Between the first rectifying terminal 3a and the second rectifying terminal 3b a rectified input voltage $V_{INR}$ is present.

The first filter capacitor 4 is connected between the first input 2a and the second input 2b of the SMPS converter stage 2 and provides a levelled input voltage $V_{INL}$ across said inputs.

The auxiliary switch transistor 105, here a transistor of an NMOS type, has its source terminal connected to the first input 2a of the SMPS converter 2 and its drain terminal connected to the activation network 107. Furthermore, a protection zener diode 108 is connected between the source terminal and a gate terminal of the auxiliary switch transistor 105 to limit the maximum voltage across said terminals. For example, the protection zener diode 108 has a reverse breakdown voltage of between 15 V and 20 V.

The activation network 107 comprises an activation resistor 110, an activation zener diode 111, and a start-up resistor 112.

The activation resistor 110 and the activation zener diode 111 are connected to one another so as to form a voltage divider between the first and second rectifying terminals of the rectifier bridge 3. In greater detail, the activation resistor 110 is connected between the first rectifying terminal 3a of the rectifier bridge 3 and an intermediate node 115 of the voltage divider. The activation zener diode 111 has its anode terminal connected to the second rectifying terminal 3b of the rectifier bridge 3 and its cathode terminal connected to the intermediate node 115. For example, the activation resistor 110 has a resistance of 270 kΩ, whereas the activation zener diode 111 has a reverse breakdown voltage $V_Z$ of, for example, 380 V.

The start-up resistor 112 is connected between the first rectifying terminal 3a of the rectifier bridge 3 and the drain terminal of the auxiliary switch transistor 105. The value of resistance of the start-up resistor 112 is much smaller than that of the activation resistor 110 and is, for example, 100Ω.

The SMPS converter stage 2 is of the flyback type already described with reference to FIG. 1 and comprises the transformer 7, with the primary winding 7a and the secondary winding 7b, the main switch transistor 8, of an NMOS type, the sense circuit 10, the insulation circuit 11, the PWM-control circuit 12, and the protection circuit 14.

The primary winding 7a of the transformer 7 is connected to the first input 2a of the SMPS converter stage 2 and to the drain terminal of the main switch transistor 8, which has its source terminal connected to the second input 2b. The secondary winding 7b is connected to the first output 1a and to the second output 1b of the power supply 1 through a diode 15 and a second filter capacitor 16, in a conventional way.

The sense circuit 10, the insulation circuit 11 and the PWM-control circuit 12 are cascade-connected between the first output 100c and the second output 100d on one side and the gate terminal of the main switch transistor 8 on the other, so as to form a feedback control loop of a conventional type. In particular, the PWM-control circuit 12 switches the switch transistor 8 with a controlled duty cycle so as to have an output voltage $V_{OUT}$ of a pre-set value between the first output 100c and the second output 100d of the power supply 100.

The protection circuit 14 is connected between the terminal of the primary winding 7a of the transformer 7 and is designed to limit the maximum voltage drop on the primary winding 7a itself. In the embodiment described herein, the protection circuit 14 comprises a series of protection zener diodes 18 and a directional diode 20 and intervenes in a one-directional way to limit the voltage on the primary winding to a maximum voltage $V_{MAX}$, for example, of 300 V.

Operation of the amplifier 100 is described hereinafter. In a start-up step, the AC input voltage $V_{AC}$ is supplied to the inputs 100a, 100b of the power supply 100. In these conditions, a current starts to flow through the activation resistor 110 of the activation network 107 and the activation zener diode 111 as soon as the rectified input voltage $V_{INR}$ between the first rectifying terminal 3a and the second rectifying terminal 3b of the rectifier bridge 3 exceeds the reverse breakdown voltage $V_Z$. Said current is sufficient to provide a voltage drop between the gate terminal and the source terminal of the auxiliary switch transistor 105, which turns on. Turning on of the auxiliary switch transistor 105 is favored by the start-up resistor 112, which brings about a small reduction in the voltage on the drain terminal and, at the same time, limits the maximum start-up current. Furthermore, the activation resistor 110 and the start-up resistor 112 are so sized that the voltages on the drain terminal and on the source terminal of the auxiliary switch transistor 105 will have the same behavior in time.

In steady-state conditions, when the rectified input voltage $V_{INR}$ is below the reverse breakdown voltage $V_Z$ of the activation zener diode 111, a negligible auxiliary voltage $V_{AUX}$ is present across the drain terminal and the source terminal of the auxiliary switch transistor 105, which is on. When, instead, the rectified input voltage $V_{INR}$ exceeds the reverse breakdown voltage $V_Z$, the activation zener diode 111 fixes the voltage of the gate terminal of the auxiliary switch transistor 105, which switches off. The voltage on the source terminal and on the first input 2a of the SMPS converter stage 2 is thus limited to a value close to the reverse breakdown voltage $V_Z$. In fact, as soon as a control voltage $V_{GS}$ between the gate terminal and the source terminal of the auxiliary switch transistor 105 drops below a threshold voltage, the auxiliary switch transistor 105 switches off, thereby decoupling the SMPS converter stage 2 from the rectifying terminals 3a, 3b of the rectifier bridge 3. The drain terminal of the auxiliary switch transistor 105 is instead free to follow the rectified input voltage $V_{INR}$ (except for a small voltage drop on the start-up resistor 112). In practice, then, the voltage divider formed by the activation resistor 110 and by the activation zener diode 111 controls the auxiliary switch transistor 105 so as to limit the levelled input voltage $V_{INL}$ substantially to the value of the reverse breakdown voltage $V_Z$ of the activation zener diode 111. In other words, the voltage divider formed by the activation resistor 110 and by the activation zener diode 111, and the auxiliary switch transistor 105 operate as a voltage-limiting device arranged between the inputs 100a, 100b and the SMPS converter stage 2 to limit the levelled input voltage $V_{INL}$ applied to the SMPS converter stage 2 itself. The excess voltage falls between the drain terminal and the source terminal of the auxiliary switch transistor 105 (auxiliary voltage $V_{AUX}$).

Considering also in this case an AC input voltage $V_{AC}$ of 450 V, the peak value of the rectified input voltage $V_{INR}$ is approximately 630 V. Since the levelled input voltage $V_{INL}$ is at most equal to the reverse breakdown voltage $V_Z$ of the activation zener diode 111 (in this case 380 V), the auxiliary voltage $V_{AUX}$ can reach approximately 250 V. Also the effects of the reflected and dispersion voltages are diminished, thus reducing the maximum value of the switch voltage $V_S$ between the drain terminal and the source terminal of the main switch transistor 8. Consequently, it is advantageously possible to use mean power or low power electrical components. For example, the main switch transistor 8 and the auxiliary switch transistor 105 can be designed for supporting voltages of up to approximately 750 V and 300 V, respectively.

The solution described above is moreover extremely flexible and may be used with SMPS converter stages of any type. In the embodiment of the invention shown in FIG. 3, for example, a switching power supply 200 comprises the rectifier bridge 3, the auxiliary switch transistor 105, the activation network 107, the filter capacitor 4 and an SMPS converter stage 202 of a buck type, with a conventional structure.

The rectifier bridge 3, the tap inputs of which form inputs 200a, 200b of the power supply 200, the auxiliary switch transistor 105, the activation network 107, and the filter capacitor 4 are connected to one another as already illustrated with reference to FIG. 2.

The SMPS converter 202, which has a first input 202a and a second input 202b and outputs forming a first output 200c and a second output 200d of the power supply 200, comprises a main switch transistor 208, an LC filter 205, of a low-pass type, a recirculation diode 207, a sense circuit 210, and a PWM-control circuit 212.

The source terminal of the main switch transistor 208 forms the first input 202a of the SMPS converter 202, whilst the drain terminal is connected to the LC filter 205.

The recirculation diode 207 has its anode terminal connected to the second input 202a of the SMPS converter 202e and its cathode terminal connected to the drain terminal of the main switch transistor 208.

The sense circuit 210 and the PWM-control circuit 12 are cascade-connected between the first output 200c of the power supply 200 and the gate terminal of the main switch transistor 208 so as to form a feedback control loop, in a way in itself known.

Finally, it is clear that modifications and variations may be made to the power supply and to the method described herein, without thereby departing from the scope of the present invention. In particular, the activation network that controls the auxiliary switch transistor can be made in a way different from the one illustrated; for example, it may also include active components. In the power supply, for example, the main and auxiliary switch transistors can be of a different type, for instance, bipolar transistors. The start-up resistor of the activation network can be of an NTC (Negative Temperature Coefficient) type.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A switching power supply comprising:
   input terminals, receiving a first voltage;
   a switching converter stage, including a first switching device;
   a second switching device, connected between said input terminals and said switching converter stage; and
   an activation device, for controlling said second switching device so as to limit a second voltage applied to said switching converter stage, the activation device comprising:
   a first resistor and a zener diode connected in series so as to form a voltage divider, the voltage divider having a first node connected to the first resistor, a second node connected to the zener diode, and an intermediate node connected to a control terminal of the second switching device; and
   a start-up resistor, wherein a first terminal of the start-up resistor is connected to the first node or the second node of the voltage divider and a second terminal of the start-up resistor is connected to a conduction terminal of the second switching device so as to reduce a voltage on the conduction terminal to facilitate a turning on of the second switching device under start-up conditions;
   wherein under steady-state conditions, the second voltage applied to the switching converter stage is limited to a value less than or equal to a reverse breakdown voltage of the zener diode in the activation device.

2. The power supply according to claim 1, wherein said first voltage is an AC voltage and further comprising a rectifier device connected between said input terminals and said voltage divider.

3. The power supply according to claim 1, wherein said first switching device and said second switching device comprise a first switch transistor and a second switch transistor, respectively.

4. The power supply according to claim 1, wherein said switching converter stage comprises a duty-cycle control circuit associated with said first switching device.

5. The power supply according to claim 1, wherein said switching converter stage comprises a DC-DC converter circuit.

6. A control method for a switching power supply comprising:
   providing a first voltage to input terminals of said power supply;
   generating a second voltage starting from said first voltage;
   converting by switching said second voltage by means of a first switching device; and
   controlling a second switching device to modify said second voltage, wherein controlling comprises reducing a voltage on a conduction terminal of the second switching device under start-up conditions, and in steady-state applying a fixed voltage to a control terminal of the second switching device when the first voltage exceeds a threshold voltage thereby causing a turning off of the second switching device.

7. The method according to claim 6, wherein said first voltage is an AC voltage, and said generating comprises rectifying and levelling said first voltage.

8. A control circuit, comprising:
   input terminals configured to receive a rectified voltage;
   a switching device; and an activation device configured to control the switching device so as to limit an output voltage of the switching device, the activation device comprising:

a first resistor and a zener diode connected in series so as to form a voltage divider arranged between the input terminals so as to receive the rectified voltage, the voltage divider comprising a first node connected to the first resistor, a second node connected to the zener diode, and an intermediate node connected to a control terminal of the switching device; and a start-up resistor, wherein a first terminal of the start-up resistor is connected to the first node or the second node of the voltage divider and a second terminal of the start-up resistor is connected to a conduction terminal of the switching device so as to reduce a voltage on the conduction terminal to facilitate a turning on of the switching device under start-up conditions.

9. The control circuit of claim 8, wherein the switching device is a switch transistor.

10. The control circuit of claim 8, wherein the output voltage is coupled to a switching converter stage of a switching power supply.

11. The control circuit of claim 8, wherein the voltage divider receives as input, a rectified AC voltage provided by a rectifier device.

12. A switching power supply, comprising:

at least one input terminal;

a switching converter stage, including a first switching device;

a second switching device coupled between the at least one input terminal and the switching converter stage; and an activation device that controls the second switching device so as to limit a second voltage applied to the switching converter stage, the activation device comprising:

a first resistor and a zener diode connected in series so as to form a voltage divider, the voltage divider having a first node connected to the first resistor, a second node connected to the zener diode, and an intermediate node connected to a control terminal of the second switching device; and a start-up resistor, wherein a first terminal of the start-up resistor is connected to the first node or the second node of the voltage divider and a second terminal of the start-up resistor is connected to a conduction terminal of the second switching device so as to reduce a voltage on the conduction terminal to facilitate a turning on of the second switching device under start-up conditions;

wherein under steady-state conditions, the activation device limits the second voltage applied to the switching device to a value less than or equal to a reverse breakdown voltage of the zener diode in the activation device.

13. The switching power supply of claim 12, wherein the first voltage is an AC voltage and the switching power supply further comprises a rectifier device coupled between the at least one input terminal and the voltage divider.

14. The switching power supply of claim 12, wherein the first switching device comprises a first switch transistor and the second switching device comprises a second switch transistor.

15. The switching power supply of claim 12, wherein the switching converter stage comprises a duty-cycle control circuit associated with the first switching device.

* * * * *